Jan. 1, 1929.  1,697,518

A. VANDERVELD

ANTISPIN MECHANISM AND REBOUND CHECK

Filed March 27, 1924   6 Sheets-Sheet 1

Inventor
Anthony Vanderveld
By Frank E. Liverance, Jr.
Attorney.

Jan. 1, 1929.　　　　　　　　　　　　　　　　　1,697,518
A. VANDERVELD
ANTISPIN MECHANISM AND REBOUND CHECK
Filed March 27, 1924　　　6 Sheets-Sheet 2

Inventor
Anthony Vanderveld.
By Frank E. Liverance, Jr
Attorney.

Inventor
Anthony Vanderveld.
By Frank E. Liverance, Jr.
Attorney.

Jan. 1, 1929.

A. VANDERVELD 1,697,518

ANTISPIN MECHANISM AND REBOUND CHECK

Filed March 27, 1924   6 Sheets-Sheet 4

Fig.9ᵃ.

Inventor
Anthony Vanderveld.
By
Frank E. Liverance, Jr.
Attorney.

Jan. 1, 1929.　　　　　　　　　　　　　　　　　1,697,518
A. VANDERVELD
ANTISPIN MECHANISM AND REBOUND CHECK
Filed March 27, 1924　　　6 Sheets-Sheet 5

Inventor
Anthony Vanderveld
By Frank E. Liverance, Jr.
Attorney.

Patented Jan. 1, 1929.

1,697,518

UNITED STATES PATENT OFFICE.

ANTHONY VANDERVELD, OF GRAND RAPIDS, MICHIGAN.

ANTISPIN MECHANISM AND REBOUND CHECK.

Application filed March 27, 1924. Serial No. 702,195.

This invention relates to an anti-spinning mechanism and rebound check, particularly adapted for use in connection with cloth measuring or combined cloth measuring and computing machines. I have made application for patent in United States and secured a Patent No. 1,420,612, issued June 20, 1922 and also have a Patent No. 1,500,349, issued July 8, 1924, for an anti-spinning mechanism to be used in conjunction with such machines; and the present invention is concerned with improvements thereover.

In cloth measuring or cloth measuring and computing machines of this character, in measuring a remnant of goods, particularly if the cloth is drawn rapidly through the machine, the mechanism may be given considerable momentum so that when the end of a remnant is reached, the mechanism may spin under the influence of this momentum and thereby indicate a greater amount than was actually measured. The present invention is partly concerned with a novel and practical mechanism for stopping the cloth measuring machine substantially at the time that the end of the remnant passes by the measuring and presser rollers of the machine with which the cloth engages, in practice, to drive the mechanism.

When anti-spinning mechanism is thus used and an abrupt stop made to the machine rebound of the mechanism or a movement thereof in the reverse direction is very likely to occur, the abrupt stop causing a material reaction which evidences itself in rebound. Accordingly, it is a further object and purpose of this invention to provide a rebound check operating to instantly prevent any reverse movement of the mechanism as soon as the anti-spinning mechanism is brought into play to check and stop any movement of the cloth measuring mechanism in a forward direction after a remnant of the cloth has been drawn therethrough and the end passed through the machine.

The invention comprises many novel details of construction and arrangements and combinations of parts for effectively attaining these ends as will fully appear when understanding is had of the invention from the following descriptions taken in connection with the accompanying drawings in which, Fig. 1 is a longitudinal vertical section through a cloth measuring and computing machine equipped with the anti-spinning mechanism and rebound check of the invention.

Figure 1:
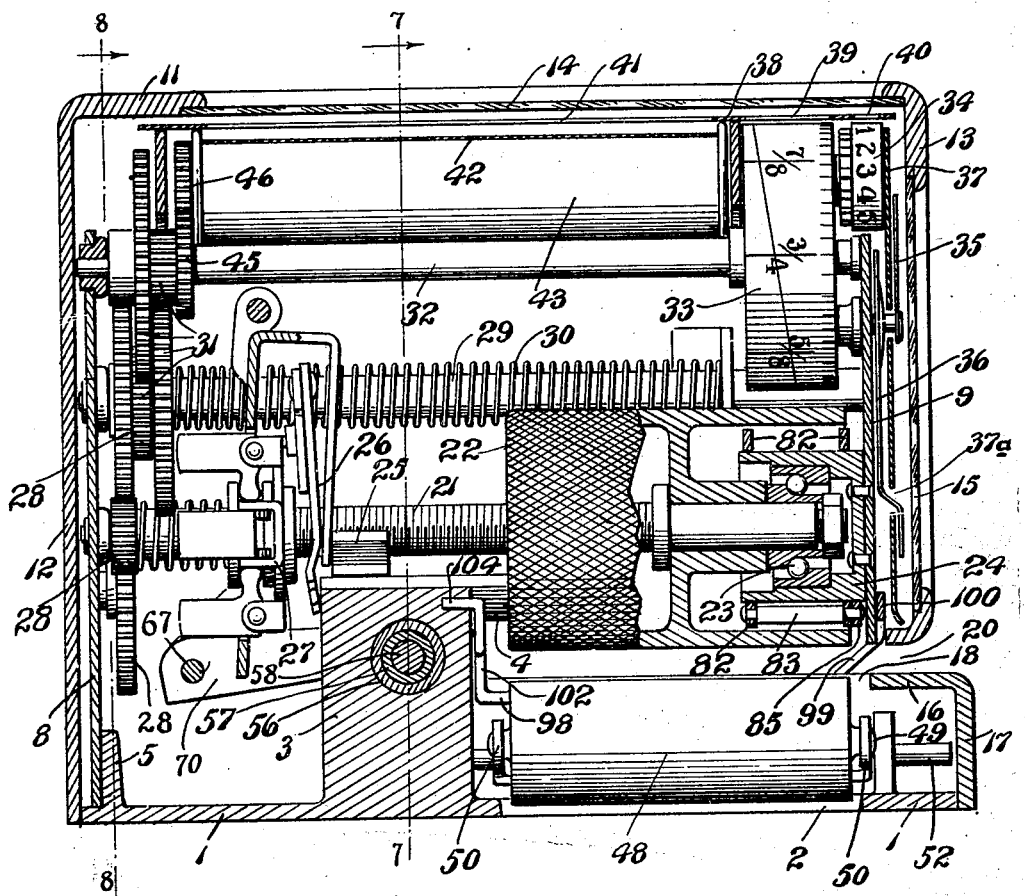
Figures 2, 3:
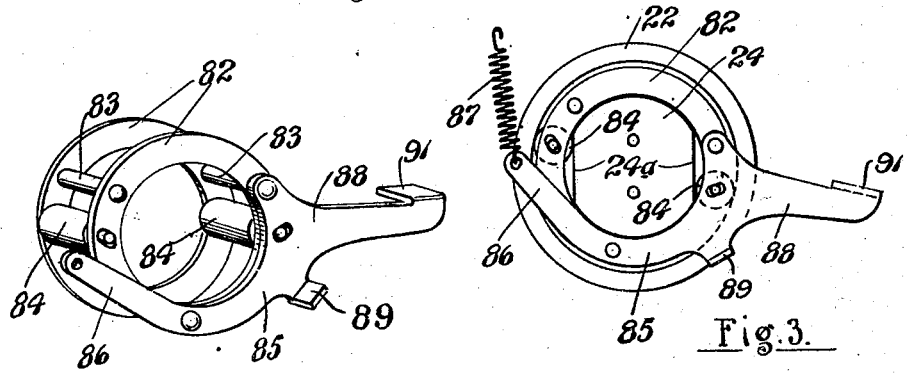
Fig. 2 is a perspective view of the roller cage element of the construction which is used in providing against spinning of the cloth measuring mechanism.
Fig. 3 is a front elevation showing the assembly of this roller cage in conjunction with the measuring roller, the rollers being in position to wedge against the inner sides of the measuring roller and stopping its movement.
Figure 7:
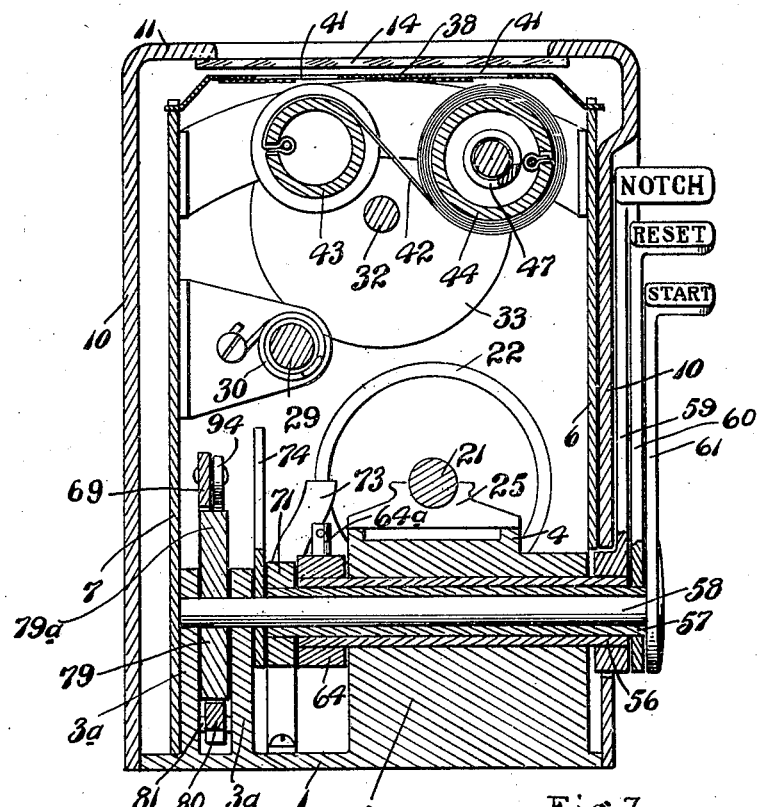
Figure 8:
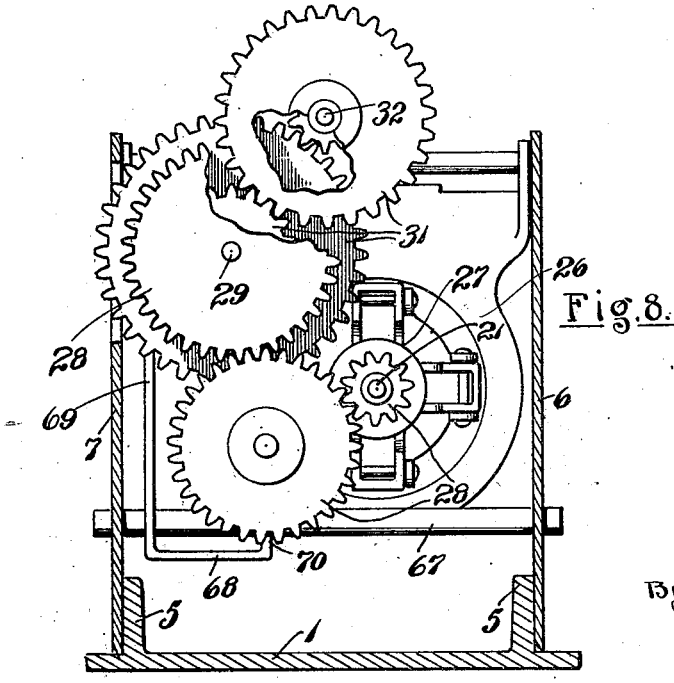

Figs. 7 and 8 are transverse vertical sections taken substantially on the planes of lines 7—7 and 8—8 of Fig. 1.

Figure 9:
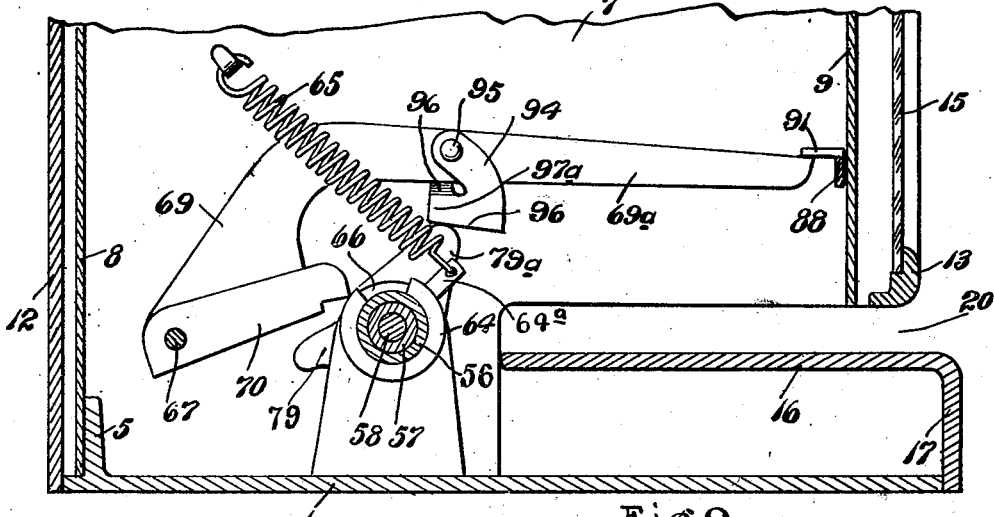

Fig. 9 is a longitudinal vertical section through the machine illustrating the means used and operated by the manual depression of the notching lever to automatically move the anti-spinning mechanism to a position where it may be latched and held against operation.

Fig. 9ª is a view similar to that shown in Fig. 9, but with the parts shown in a different position.

Figure 10:
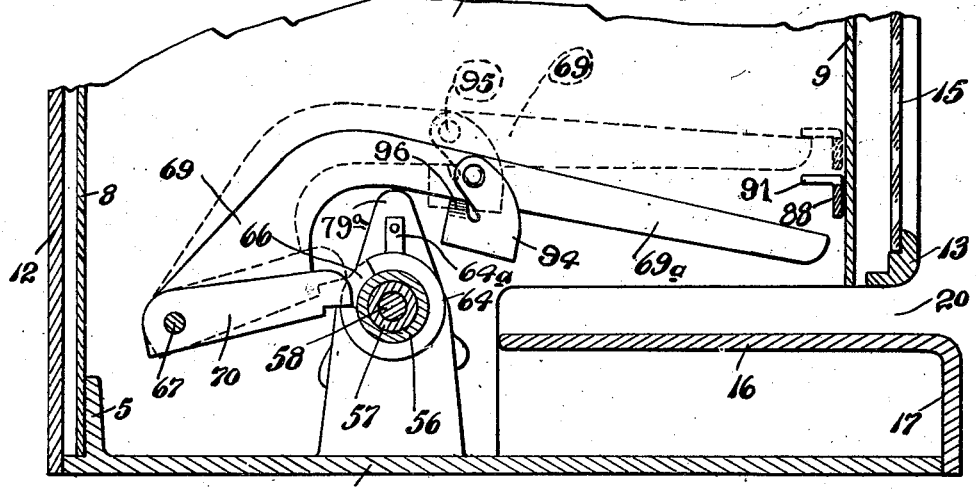
Figure 10:
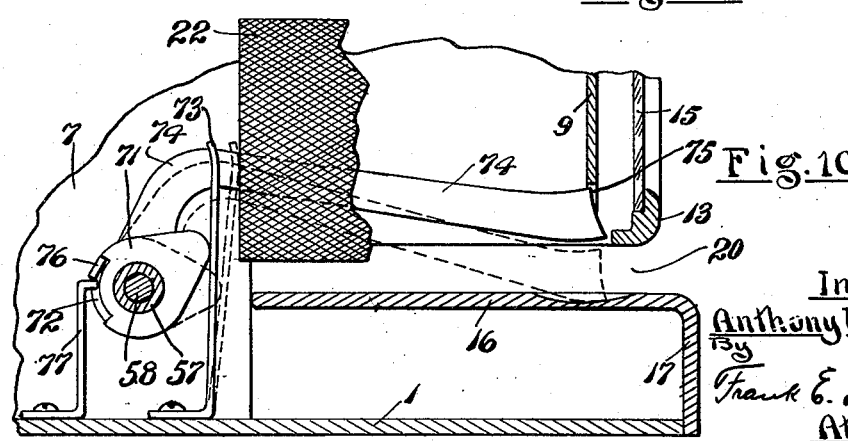

Fig. 10 is a section similar to that shown in Fig. 9, the plane of the section being at a different part of the machine to illustrate the throat lock device.

Figure 11:
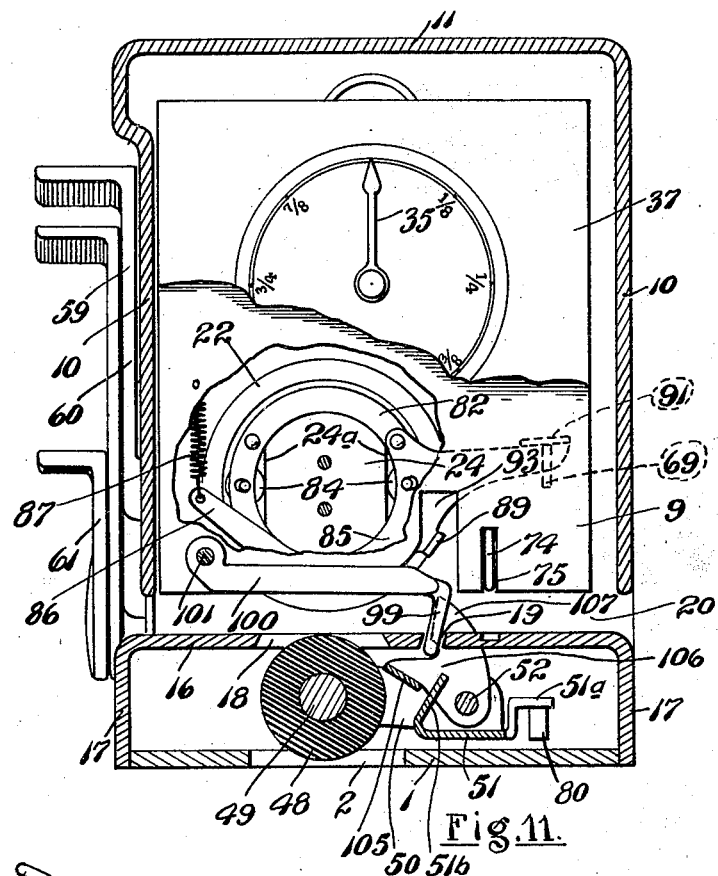

Fig. 11 is a transverse section and partial front elevation illustrating the association of the anti-spinning device, the cloth operated bail and the rebound check, the parts being in the position they occupy after a cloth measurement has been completed and the cloth notched and the mechanism returned to initial zero position.

Figure 12:
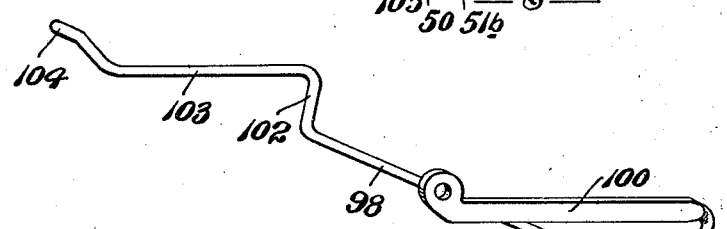

Fig. 12 is a perspective view of the pivotally mounted cloth operated bail used in connection with both the anti-spinning mechanism and the rebound check.

Figure 13:
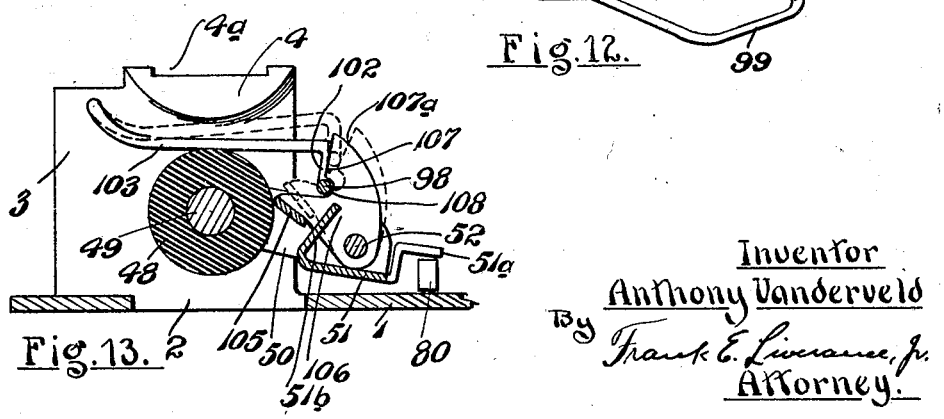

Fig. 13 is a fragmentary vertical section showing the rebound check in its operative position in full lines and the same in inoperative position in dotted lines.

Figure 14:
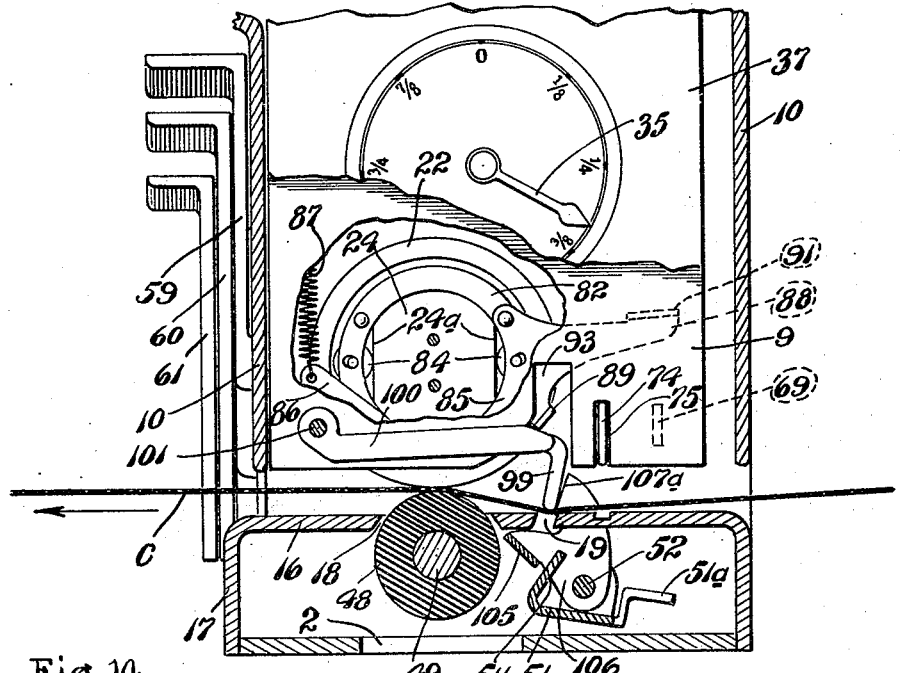
Figure 15:
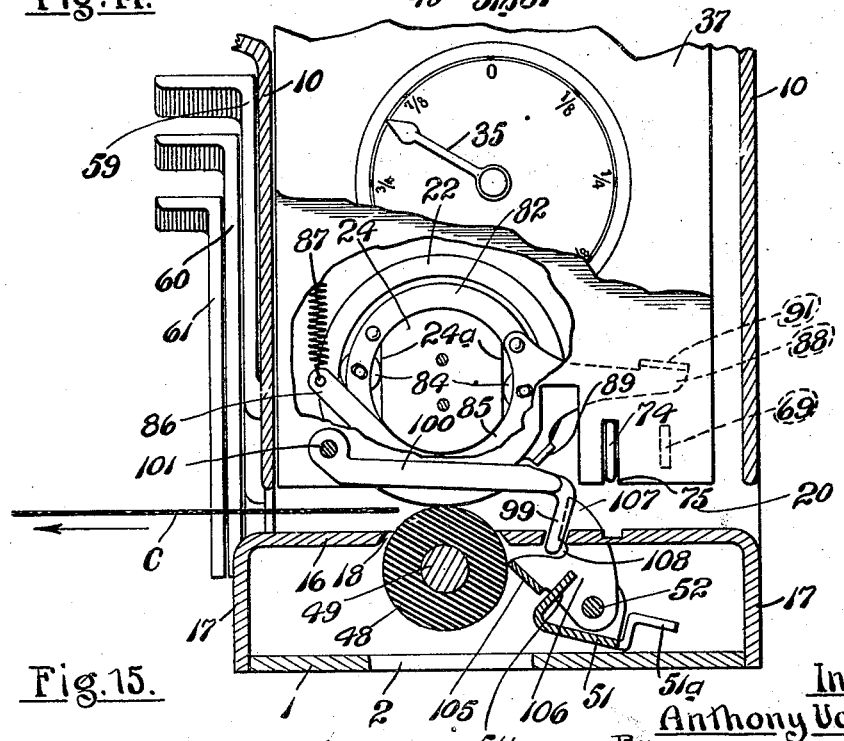

Fig. 14 is a view similar to Fig. 11 but showing the parts in a different position or that which they occupy during the measurement of a length of cloth or similar fabric, and Fig. 15 is a like view showing the position of the parts immediately after the end of a remnant of cloth has passed through the rollers.

Like reference characters refer to like parts in the different figures of the drawings.

In the construction of the machine, a base 1 of substantially rectangular form is provided in the forward portion of which a relatively wide elongated opening 2 is made. A post 3 is cast integrally with the base with which, at its upper end, a guide 4 is integrally cast, the same extending forward and being formed on its upper side with a wide groove 4$^a$ as shown in Fig. 13. Upwardly projecting ribs or flanges 5 are also cast integral with the base adjacent its side and end edges. To these flanges the lower edges of side plates 6 and 7 and a rear plate 8 are permanently secured, said side plates, rear plate and a front plate 9 connected to and located between the front edges of the side plates 6 and 7 forming a supporting frame for the major portion of the mechanism of the machine. The plate 9 terminates a distance short of the base 1 for a purpose which will later appear.

This frame and the mechanism carried thereby is enclosed in a casing of metal having vertical sides 10, a top 11, back 12 and a front side 13 as shown, an opening being made in the top 11 wherein a glass plate 14 is secured; while the front 13 which extends downwardly only as far as the plate 9 extends, is likewise formed with an opening in which a glass plate 15 is secured. This casing covers the rear portion of the machine and the upper part of the front portion of the machine. The lower part of the front of the machine is enclosed in a separate casing member having a horizontal top or table 16 from which sides and a front 17 extend downwardly. The table 16 is formed with an elongated slot 18 directly above the opening 2 in the base 1 and a short distance therefrom with a narrower slot 19. Between the table 16 and the lower edge of the plate 9 and the front 13 of the casing, a horizontal slot 20 is made which in practice is termed the "throat" of the machine and into which the cloth indicated at C in Figs. 14 and 15 may pass through the machine in the operation of measuring.

A shaft 21 is located horizontally and longitudinally of the machine and a measuring roller 22 is fixed thereto. The rear end of the shaft is mounted in a suitable bearing carried by the rear frame plate 8 and its front end is carried in a roller bearing 23 mounted in a suitable housing 24 which is permanently secured to and lies back of the front plate 9. Shaft 21 is threaded for a part of its length with which a half nut 25 engages the same being received and guided in the groove 4$^a$ previously described. This nut 25, for one of its functions, is designed to operate mechanism indicated as a whole at 26 and used in conjunction with a centrifugal brake apparatus indicated at 27 as mounted on the shaft 21 for the stopping of the mechanism in zero position. However, this mechanism forms the subject matter of a previous application by me having Serial No. 621,269, filed Feb. 26, 1923 and need not be described herein.

The shaft 21 through a series of gears and pinions 28 drives a second shaft 29 located above and to one side and in parallel with shaft 21 on which a torsion spring 30 is mounted to be wound by the shaft as it turns. Shaft 29, through additional pinions and gears 31, drives a third shaft 32 located above and parallel to shafts 21 and 29 on which at its front end a drum 33 is secured. All of the shafts are mounted between the rear and front plates 8 and 9. In front of the drum 33 a yards wheel 34 is mounted. Shaft 32 is designed to drive a hand 35 and a second hand 36, said hand 35 being located in front of an indicator plate 37 to pass over a suitable dial and the hand 36 at its lower end passing through a slot 37$^a$ in the indicator plate 37 to pass over suitable indicating figures thereon. The mechanism for driving the yards wheel and the hands is not in any way concerned with the present invention and a detailed description thereof is not made.

A plate 38 is located above the drum 33 and yards wheel 34 having openings 39 and 40 directly above said drum and yards wheel. This permits inspection from above so that the measurement indicated can be read. The plate also is provided with two elongated slots 41, back of the openings 39 and lying over a chart 42 which is connected at its ends to rollers 43 and 44, the slots lying directly above said rollers. Roller 43 is driven through a gear 45 on shaft 32 meshing with a gear 46 secured to the roller 43. A spring 47 is associated with the roller 44 for storing power for the rewinding of the chart on the roller 44 when free to do so.

Figure 4:
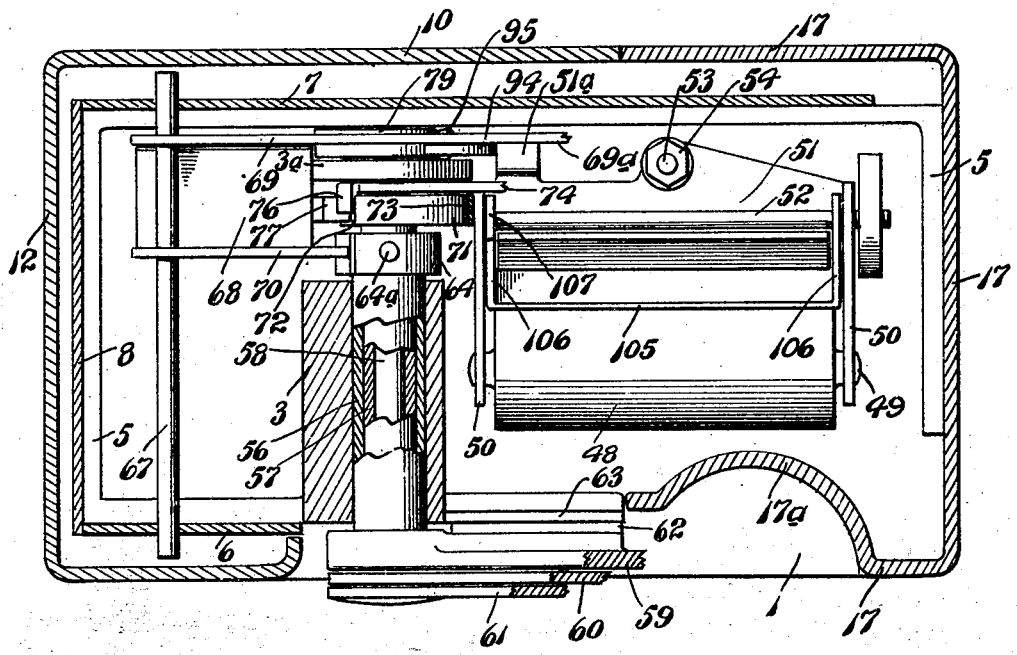
Fig. 4 is a horizontal section through the machine, the plane of the section being substantially co-incident with the cloth entrance slot or throat of the machine.
Figure 5:
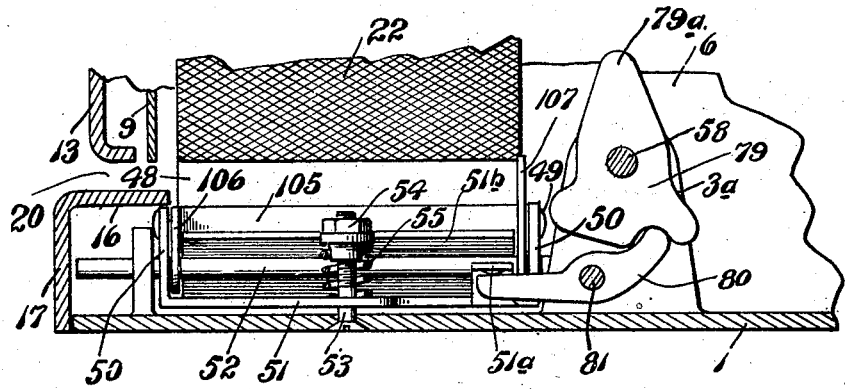
Fig. 5 is a fragmentary vertical section at one side and at the front of the machine showing the means used for separating the presser roller from the measuring roller.
Figure 6:
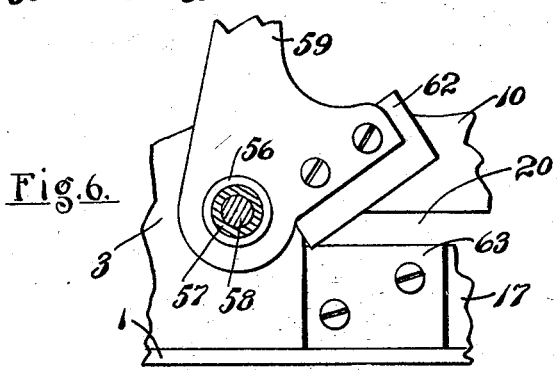
Fig. 6 is a fragmentary side elevation showing the notching lever and knives used in conjunction therewith.

Below the measuring roller 22 a presser roller 48 is rotatably mounted on a shaft 49 which is carried between two spaced apart parallel arms 50 connected by an integral cross plate 51, the arms and plate being made from a single piece of sheet metal. The presser roller is located so as to pass upwardly through the slot 18 to bear against the measuring roller 22 or against cloth interposed between the measuring and presser rollers. The frame for carrying the presser roller is pivotally mounted on a shaft 52 carried on suitable supports connected with the base 1 as shown. As shown in Figs. 4 and 5, a screw 53 extends upwardly through the base 1 and through the cross plate 51 having a nut 54 at its upper end between which and the plate 51, a spring 55 is interposed, the effect of which is to normally force the presser roller upwardly against the measuring roller or the cloth between them.

An outer sleeve 56, a second inner sleeve 57 within the sleeve 56 and a shaft 58 within the sleeve 57 pass through the post 3 and are independently rotatable with respect to each other. At the outer ends of sleeves 56 and 57 and the shaft 58, operating levers 59, 60 and 61 are respectively connected for manually operating each independently of the other. The lever 59 carries a blade 62 which co-operates with a second blade 63 located below the throat 20 to be used to notch the cloth at the end of the measuring operation. This notching is accomplished by pressing the lever 59 downwardly. Normally the lever 59 is in upper position and as soon as it is released after depression it immediately returns to upper position, this by reason of a collar 64 fixed to an inner end of the sleeve beyond the post 3 (Fig. 4) with a spring 65 connected to one end of a pin 64ª attached to the collar (see Fig. 9) the tendency of which is to move the notch lever upwardly. Collar 64 in its rear side is formed with a recessed or notched portion 66 substantially as shown in Fig. 9.

A rod 67 is horizontally located back of the post 3 and extends through between the side plates 6 and 7 of the supporting frame. On this rod adjacent the side plate 7, a member is pivotally mounted comprising a horizontal plate 68 having up-turned sides 69 and 70, through the rear ends of which the rod 67 passes. The side 69 is extended upwardly and then forwardly making an elongated finger 69ª which reaches nearly to the front plate 9. The plate 70 is projected forward a short distance in front of part 68, its front end being received in notch 66 of collar 64 (see Figs. 4 and 9). It is evident that with the depression of the notch lever 59 and rotation of collar 64 this member on the rod 67 is moved from the full line position shown in Fig. 9ª to that in dotted lines.

The sleeve 57 located within the sleeve 56 at its inner end carries a cam 71 in the rear side of which an arc shaped recess 72 is cut. A spring brake member 73 is fastened to the base plate 1 adjacent the rear end of the measuring roller 22. When the lever 60 is depressed, cam 71 bearing against the rear side of the brake 73 moves it from the full line position shown in Fig. 10 to the dotted line position in which it is pressed against the roller 22 holding or braking it so that it will not move from the position in which it is held.

Alongside of the cam 71, a throat lock or stop member 74 is loosely mounted on the shaft 58 extending upwardly and then being turned to extend forwardly so that its front end is received in a slot 75 in the lower edge of the plate 9. From the rear end of the member 74 a lug 76 is turned laterally and is received in the recess 72 in the cam 71. It is obvious that on depression of lever 60, the brake is pressed against the measuring roller 22 and the throat lock or stop 74 is free to fall by gravity until it rests against or in a recess in the table 16 thereby obstructing the throat 20 so that cloth cannot be inserted therein. The lever 60 when depressed remains in depressed position until released due to the friction of cam 71 against the brake 73. When it is released the shoulder on said cam at the recess 72 comes against the lug 76 and elevates the throat lock member 74 until lug 76 comes against a suitable stop 77 fastened to the base plate 1 as shown in Fig. 10 and is held in place by the brake 73.

The shaft 58 operated by the lever 61 at its inner end extends beyond the sleeve 57 passing through suitable additional supports 3ª cast integral with the base 1, and at its end is equipped with an irregularly shaped cam member 79 which lies above the rear end of a lever 80 pivotally mounted between its ends at 81 between said supports 3ª as shown in Fig. 5. The front end of the lever extends under a finger 51ª formed integral with the cross plate 51 of the presser roller supporting frame. Depression of lever 61 turns cam 79 to the rear and over the up-turned end of the lever 80 thereby moving the presser roller downwardly and away from the measuring roller, in which position it is held by the engagement of the lower side of the cam 79 against the end of the lever 80.

Over the roller bearing housing 24 and between it and the inner sides of the front end of the measuring roller 22, a roller clutch element is located. In its construction a cage is used consisting of two spaced apart rings 82 connected by suitable posts 83. Two diametrically opposed rollers 84 are mounted in inclined slots in said rings. The roller bearing housing has opposite sides flattened to make vertical faces 24ª and the rollers 84 are located between these faces and the inner sides of the measuring roller 22. An irregular shaped member 85 formed from flat metal is permanently secured to the front ring 82 and has a projecting arm 86 at one end of which a coiled spring 87 is connected, the spring extending therefrom to and being connected with the front plate 9. At its opposite end the member 85 is formed with a substantially horizontal arm 88 from which a lug 89 is turned forwardly, a second lug 91 being turned to the rear. The lug 89 is turned from the lower edge of the arm 88 and lug 91 from the upper edge and near an end thereof. The last mentioned lug 91 is located directly over the front end of the finger 69 heretofore described. Lug 89 passes through an opening or wide slot 93 made in the plate 9, it being understood that the member 85 lies close to the back of the plate 9.

On the inner side of the finger 69ª, a pawl 94 is pivotally mounted at 95, depending therefrom by gravity. This pawl is freely movable on the pivot and its lower end is formed so as to tend to swing the pawl to the rear toward the upper extension 79ª of cam 79 so as to pass over the upper end thereof in one position, an inturned lug 96 on the pawl engaging under the lower edge of the finger 69ª to prevent such movement too far to the rear. If only the notch lever 59 is operated and released, finger 69ª will be raised and lowered merely without anything being functionally performed by the said finger.

If, after depressing the notch lever 59 with an elevation of finger 69ª, the lever 61 be also depressed, the turning of shaft 58 and the cam 79 thereon brings the upper end of the projecting portion 79ª of the cam under the lower side 97 of the pawl 94, as shown in Fig. 9, thereby holding the finger 69ª in upper position; and as the forward end of the finger comes under the rearwardly turned lug 91 on member 88, there is a turning of the roller cage to position such that the measuring roller is free to rotate. On release of the lever 61 to return to normal position and with a movement of the presser roller toward the measuring roller, the dog 94 is released and the finger 69ª drops to lower position, shown in full lines in Fig. 9ª.

A bail is pivotally mounted so as to extend across the throat 20 and be elevated by the cloth passing under the same during the operation of the machine. The bail includes a horizontal rod 98 which normally passes downwardly through the slot 19 in the table 16. Adjacent the front end of rod 98, it is turned upwardly and forwardly at an angle, as indicated at 99 and is then flattened and turned substantially at right angles making arm 100 which is pivotally mounted at its end at 101 on plate 9 being located at the front of said plate. The arm 100 lies directly beneath the lug 89 on arm 88. At its opposite end rod 98 is turned upwardly as indicated at 102 and then horizontally, as indicated at 103, and finally terminates in a pintle 104 which is received in a suitable recess in the post 3 (Fig. 1) so that the bail is pivotally mounted and is normally free to drop by gravity through the narrow slot 19 in table 16. Below the table 16 a rebound check member is mounted, including a cross bar 105 of sheet metal which is adapted in one position to lie against the presser roller 48. From its ends, two arms 106 extend at right angles and downwardly and are pivotally mounted on the rod 52 inside of the arms 50 of the presser roller frame. The inner arm 106 has an upward projection 107 and between it and the arm 106 a recess or notch 108 is formed in which the cross rod 98 of the bail may be received. Arm 107 at its end is formed with an inclined face 107ª. On upward movement of the bail the rod 98 rides against the face 107ª and holds the cross member or bar 105 of the rebound check away from the presser roller, permitting its free rotation in either direction.

In the operation of the machine, if it be supposed that the mechanism is at its initial zero position, the rollers separated and brake released, but with the power roller held against rotation through the action of the rollers 84 wedging between the said power or measuring roller and the sides 24ª of the housing 24, the operator inserts cloth or like fabric C into the machine at the throat 20, the cloth passing under the inclined end portion 99 of the bail and thence under the rod 98, this elevating the bail from the position shown in Fig. 11 to that shown in Fig. 14. Elevation of the bail causes the rebound check to be moved away from the presser roller by bearing of the rod 98 against the face 107ª of the arm 107 and also turns the member 85 and attached roller cage through the engagement of the arm 100 against lug 89 as the bail is elevated, thereby freeing the measuring roller for free movement in either direction. The lever 61 is then moved to release position by an upward and rearward push, freeing the presser roller frame so that the presser roller moves upwardly and presses the cloth against the measuring roller. The machine may now be operated by drawing the cloth between the measuring and presser rollers until a desired length has passed as will be indicated by the various indicating devices of the machine.

When the desired length of cloth has been measured, the operator of the machine depresses all of the levers 59, 60 and 61. Depression of the lever 59 notches the goods where it is to be cut off and simultaneously elevates the finger 69ª and attached dog 94, the forward end of the finger under the lug 91 lifting the arm 88 and moving the roller cage of the clutch associated with the measuring roller to inoperative position. The depression of the lever 61 turns the cam 79 so that the upwardly projecting end 79ª thereof engages under the dog 94 holding the finger 69ª in upper position. And the depression of lever 60 sets the brake against the measuring roller 22. The necessity for holding the roller clutch construction, acting when in operative position to hold the measuring roller from movement, is apparent when it is seen that the measuring roller must be free for return movement of the mechanism to initial zero position after the length measured and the price thereof has been taken from the indicating means and the computing chart, this return to zero position being had by releasing the brake lever 60 as soon as the necessary data has been taken from the machine. Simultaneously with the freeing of the machine for the return to zero position under the influence of spring 30, the throat lock member 74 is elevated, it having been freed to fall by gravity on the downward movement of the lever 60, the rollers being left spaced for the reception of a succeeding length of cloth for a repetition of the operation.

With the placing of cloth between the rollers and elevation of the bail followed by a release of the presser roller by operating lever 61 upwardly and to the rear, cam 79 moves at its upper portion to the rear and from under the dog 94 which cannot follow the cam through frictional engagement therewith by reason of the stop interposed by lug 96 of said dog against the finger 69ª. Accordingly, the roller clutch mechanism is freed to fall to operative position as soon as the presser roller is released and is ready to perform its stopping function with respect to the measuring roller and would do so except for the holding up of the bail by the cloth. And when the end of a remnant of cloth passes by the bail so as to permit it to drop by gravity, the measuring roller is immediately stopped from further rotation with the turning of the roller cage so as to wedge rollers 84 between the inner sides of the measuring roller and the sides 24ª of the housing 24.

With the dropping of the bail when the end of a remnant of cloth passes by the same, the rebound check member is also dropped to the position shown in Fig. 15 so that the edge of the cross bar 105 comes against the presser roller 48 whereupon, if there is any tendency for the measuring roller 22 to rebound from the shock of abrupt stopping, such rebound movement is transmitted to the presser roller and stopped instantly by the bar 105 binding against the presser roller.

From the foregoing it is apparent that a particularly effective construction of anti-spinning mechanism combined with a rebound check for use in cloth measuring or cloth measuring and computing machines has been provided. The bail normally drops by gravity and is elevated only when cloth is inserted thereunder. The elevation of the bail automatically frees the presser roller from the rebound check and likewise moves the roller clutch element of the anti-spinning device to a position where it will not interfere with the free movement of the measuring roller. Simple and effective means are provided whereby the anti-spinning roller clutch may be operated to stop the machine when the end of a remnant of cloth or like fabric passes by the bail and immediately thereafter be made ineffective to prevent the mechanism from returning to zero position when the brake is released, this being done by a depression of the notching lever independently of the operation of the brake release lever 60; while this means for rendering the anti-spinning device inoperative so as to allow reset of the machine to zero is automatically released as soon as cloth is again entered into the machine and the lever 61 released to bring the rollers together.

The opening 2 in base 1 directly below the presser roller provides an outlet for lint, ravellings, and the like coming from the cloth, and the part 51ᵇ turned upwardly and at an angle to the cross member 51 serves to direct the lint to said opening. Moreover the means used to spring actuate the presser roller frame is novel and particularly practical and efficient. The invention is defined in the appended claims and is to be considered as comprehensive of all forms of construction coming within their scope.

I claim:

1. In a machine of the class described, a pair of rollers normally held against each other, measuring mechanism driven by one of said rollers, means normally holding said driving roller against operative rotation, a lever, and means operated by said lever for rendering said means ineffective, while the rollers are together in normal position against each other.

2. In a machine of the class described, a pair of rollers normally held against each other, measuring mechanism driven by one of said rollers, means normally holding said driving roller against operative rotation, means automatically operated by the cloth passed between said rollers and engaging said first means to render said first means ineffective, and an additional manually operated means for rendering said first means ineffective, while the rollers are together in normal position against each other.

3. In a fabric measuring machine, a pair of rollers normally held against each other, one of said rollers being a driving roller for the machine and fabric being drawn between the rollers to operate said driving roller, means normally holding said driving roller against operative rotation, means operated by the fabric as it is drawn between the rollers for operating said holding means to inoperative position to permit free rotation of the driving roller, means for notching the fabric at the end of an operation of the machine, and means for simultaneously rendering the holding means ineffective through operation of the said notching means.

4. In a fabric measuring machine, a pair of rollers normally held against each other, one of said rollers being a driving roller for the machine and fabric being drawn between the rollers to operate said driving rollers, means normally holding said driving roller against operative rotation, means operative by the fabric as it is placed between the rollers for rendering said holding means ineffective, means for releasably acting on the driving roller and manually operable at the end of a measuring operation to hold the roller against rotative movement in either direction, a fabric notching means movably mounted and manually operable independently of said first manually operable means, and means for simultaneously rendering said first holding means ineffective with the operation of the notching means.

5. In a machine of the class described, a pair of rollers normally held against each other, indicating means operated by one of said rollers, a casing covering said rollers and having a slot in alinement with the line of contact of the rollers, means for spacing the rollers, a member located in said slot and movably mounted under which fabric may be inserted to pass between the rollers, and means operatively connected with said member to normally engage with the other of said rollers to prevent rotation thereof in one direction, said means being moved away from said other roller on placing the fabric under said member.

6. In a machine of the class described, a pair of rollers normally held against each other, indicating means operated by one of said rollers, means normally holding said roller against operative rotation, means normally engaging the other of said rollers to stop rotative movement thereof in a direction reverse to its operative movement, and a member movably mounted and located below the plane of contact of the rollers connected with both said holding means for the first roller and engaging means for the second roller, said member being elevated by insertion of fabric thereunder and operating to render both of said means ineffective, but both becoming immediately effective as soon as the end of a remnant of cloth passes from said member.

7. In a machine of the class described, a pair of rollers normally held against each other between which fabric is adapted to be drawn, indicating means driven by one of said rollers, means acting to prevent rotation of said driving roller and positively stopping the same when the end of a length of cloth comes to said rollers, and means for preventing rebound of the roller in the opposite direction due to the abrupt stopping thereof by the first means.

8. In a machine of the class described, a pair of rollers normally held against each other, a member located adjacent the rollers and during the operation of the machine acted upon by fabric drawn between the rollers, means normally acting to stop operative rotation of the measuring roller, said means being engageable by said member and rendered ineffective while fabric is being drawn through between the rollers, and acting upon said member, an independently mounted and operable notch lever pivotally mounted on the machine, and means for rendering the said stop means inoperative on operation of the notch lever to notch the fabric at the end of a measuring operation.

9. In a machine of the class described, a pair of rollers normally held against each other, measuring mechanism including indicating means driven by one of said rollers, spring means included in the measuring mechanism for returning the same to initial position, means for separating the rollers, means for braking the driving roller against movement, means for notching fabric drawn between the rollers at the end of a measuring operation, means normally holding the driving roller against operative rotation, means operated by the fabric for rendering said means ineffective during a fabric measuring operation, and means operated by the notching means for also rendering said means ineffective with the operation of said notching means.

10. In a machine of the class described, a pair of rollers, indicating means operated by one of said rollers, means for zero-setting the indicating means, means for holding the machine against zero-setting and manually releasable to permit said zero-setting, means normally holding the rollers against operative rotation, means operated by fabric drawn between the rollers for rendering said holding means ineffective during a fabric measuring operation, a manually operable means for moving said holding means to inoperative position to permit zero-setting when said manually releasable means is released, said manually operable means being independent of said manually releasable means, substantially as described.

11. In a machine for measuring fabric, a pair of rollers normally held against each other and adapted to be moved apart, one of said rollers being a measuring roller, indicating means operated by said measuring roller, means for zero-setting the indicating means, means normally holding the measuring roller against operative rotation, manually operable means for holding the indicating means from return to zero-setting when the rollers are moved apart, independent manually operable means for moving the rollers apart, means operated by fabric passing between the rollers for rendering said measuring roller holding means ineffective during a measuring operation but freeing it when a measuring operation ends to thereby become effective, and manually operable means independent of the roller separating means and of the indicating holding means for rendering said measuring roller holding means ineffective to permit zero-setting when said indicating holding means is released.

12. In a machine for measuring fabric, a pair of rollers normally bearing against each other, one of which is a driving roller for the machine, fabric being drawn between the rollers to operate the driving roller, a bail member pivotally mounted and having a rod portion normally located in a plane below the line of contact of the rollers, means normally preventing operation of the driving roller to operate the machine, an arm associated with said means adapted to be operated by said bail member to turn said means to inoperative position when fabric is inserted under the bail to lift the same, and a latch means engaging with and adapted to hold the said means in operative position, substantially as described.

13. In a machine for measuring fabric, a pair of rollers normally pressing against each other and between which fabric may be drawn, one of said rollers being a driving roller for the machine, means for separating the rollers, means normally preventing operative rotation of the driving roller, a bail member pivotally mounted and having a horizontal portion paralleling the rollers and normally located in a plane below the line of contact of the rollers, in all positions of said rollers, the outer end of said portion being turned upwardly and outwardly at an angle whereby fabric may be inserted thereunder, and means connected with said first means adapted to be operated by said bail member when it is elevated by the fabric to free the driving roller for operative rotation.

14. In a machine for measuring fabric, a pair of rollers normally pressing against each other, one roller being located over the other and being a driving roller for the machine, means for spacing the rollers apart, means normally engaging with said driving roller to prevent operative rotation of the same, a member mounted for free movement adjacent the rollers and parallel thereto having a horizontal portion with an upturned outer end, said horizontal portion lying normally below the line of contact of the rollers in all positions of said rollers and being elevated above its normal position by fabric drawn between the rollers, and an arm extending from the roller rotation prevention means adapted to be engaged and operated by said member when it is elevated by the fabric to move said roller prevention means to inoperative position.

15. In a machine for measuring fabric, upper and lower rollers normally pressing together but adapted to be separated, manually operated means for separating the rollers, indicating means driven by one of the rollers, means normally preventing operative rotation of the driving roller, means for zero-setting the indicating means, a manually operable means for releasably holding the indicating means from return to zero position, an independently manually operable means for notching fabric located between the rollers at the end of a measuring operation, a freely pivoted member having a horizontal portion normally located below the plane of the line of contact of the rollers and substantially parallel to the axes of the rollers under which the fabric passes, being elevated by the fabric during a measuring operation, an arm extending from the roller rotation prevention means having a forwardly extending lug and a rearwardly extending lug, said pivoted member engaging with the forwardly extending lug on elevation by the fabric, and a member operated by the manual operation of the notching means to engage under said rearwardly extending lug to elevate the arm and move the roller prevention means to inoperative position.

16. A construction containing the elements in combination defined in claim 15, combined with a dog pivotally connected to said member, and means included in said means for separating the rollers to engage with the dog on separation of said rollers to hold said member in position to hold the arm in elevated position, substantially as described.

17. In a cloth measuring machine, the combination of a measuring roller, a presser roller associated therewith and adapted to be spaced therefrom, indicating means driven by the measuring roller, and means acting to prevent the measuring roller from actuating the indicating means to show either a greater or a less length than the substantial length of goods passed through the machine.

18. In a machine for measuring fabric, an upper driving roller, a lower roller mounted to press against the driving roller, fabric being pulled between the rollers for operating the driving roller, means inoperative when fabric is being drawn between the rollers for preventing operative rotation of the driving roller when the fabric is out of the machine, whereby said driving roller is stopped immediately when the end of a length of fabric comes to the rollers, and means for preventing rebound of the driving roller when it is stopped by said rotation prevention means, substantially as described.

19. In a machine for measuring fabric, an upper driving roller, a lower roller mounted to press against the driving roller, whereby both rollers are rotated when fabric is drawn between the same, means for normally preventing operative rotation of the driving roller, said means being rendered ineffective when fabric is placed between the rollers but acting when the end of a piece of fabric comes to the rollers, and means mounted to engage with the lower roller when the end of a piece of fabric passes through said rollers to prevent the same and the driving roller engaging thereagainst from rotating in the direction reverse of operative rotation, substantially as described.

20. In a machine for measuring fabric, an upper driving roller, a lower roller mounted to press against the driving roller, whereby both rollers are rotated when fabric is drawn between the same, means for normally preventing operative rotation of the driving roller in one direction, said means being rendered ineffective when fabric is drawn between the rollers but acting when the end of a length of fabric comes to the rollers, means mounted to engage against the lower roller to hold the same and the driving roller engaging thereagainst from rotating in the direction reverse of operative rotation, and means for holding said lower roller engaging means away from the roller when fabric is being drawn between the rollers.

21. In a machine for measuring fabric, a driving roller, indicating means driven thereby, said driving roller being operated in one direction to drive the indicating means by fabric drawn through the machine and pressed against the driving roller, means for preventing operative rotation of the driving roller in said direction, said means being rendered ineffective when fabric is being drawn through the machine but acting when the end of a length of fabric comes to the roller, thereby immediately stopping further operative rotation of the roller, and means for preventing rebound of the roller when it is thus stopped by said rotation prevention means.

22. In a machine for measuring fabric, a measuring and a presser roller adapted to be driven by pulling cloth between the rollers, indicating means driven from the measuring roller when the roller is rotated in one direction, means for normally preventing operative rotation of said measuring roller in said direction, means operated by fabric between the rollers for rendering said roller rotation prevention means ineffective, said roller rotation prevention means becoming effective when the end of a length of fabric comes to the rollers, means for zero-setting the indicating means, means for holding the zero-setting means from acting at the end of a fabric measuring operation, said means being manually set and released, and an independently manually operable means for moving the roller rotation prevention means to inoperative position, substantially as and for the purpose described.

23. In a machine for measuring fabric, measuring and presser rollers adapted to bear against each other and operated by fabric drawn between them, means for indicating the length of fabric drawn between the rollers operated from the measuring roller, means normally preventing operative rotation of the measuring roller in the direction necessary to operate the indicating means, means mounted to engage with said rotation prevention means and move the same to inoperative position on placing fabric between the rollers, and means for preventing rotation of the measuring roller in the reverse direction combined with means to render said reverse rotation preventing means inoperative when fabric is being drawn between the rollers.

24. In a machine for measuring fabric, measuring and presser rollers adapted to bear against each other and operated by fabric drawn between them, means for indicating the length of fabric drawn between the rollers operated by the measuring roller, means normally preventing operative rotation of the measuring roller in the direction necessary to operate the indicating means, means mounted to engage with said roller rotation prevention means and move the same to inoperative position on placing fabric between the rollers, manually operable means for independently moving the rotation prevention means to inoperative position, independent means for separating the rollers, and latch means for automatically engaging said rotation prevention means when the rollers are separated to hold it in inoperative position.

25. In a machine for measuring fabric, measuring and presser rollers adapted to bear against each other and to be spaced apart and operated by fabric drawn between them, means for indicating the length of fabric drawn between the rollers operated by the measuring roller, means normally preventing operative rotation of the measuring roller in the direction necessary to operate the indicating means, means movably mounted adjacent the rollers to engage with said roller rotation prevention means to move the same to inoperative position on placing fabric between the rollers, a manually operable means for independently moving said rotation prevention means to inoperative position, means for separating the rollers and latch means made effective on separation of the rollers for holding said manually operable means in position after movement thereof to make ineffective the rotation prevention means at times when fabric is not between the rollers.

26. In a machine of the class described, a presser roller, a measuring roller paralleling said presser roller, a frame including two arms connected by a cross bar paralleling the presser roller pivotally mounted on an axis located a distance from the presser roller and parallel thereto, said presser roller being rotatably mounted between said arms, a base over which said frame and presser roller are mounted, said frame being pivotally mounted on the base, a screw passing through the base and the cross bar, a nut at the end of the screw, and a compression spring between the nut and cross bar acting to force the frame about its pivotal mounting to press the presser roller against the measuring roller.

27. In a machine of the class described, a measuring roller, a presser roller associated therewith and adapted to be spaced therefrom, indicating means driven by the measuring roller, said measuring roller being adapted to be operated by fabric drawn between the rollers, means for normally preventing operative rotation of the measuring roller, means actuated by the fabric as it is drawn between the rollers for moving said rotation prevention means to inoperative position, manually operative means for independently moving said rotation prevention means to an inoperative position, means for latching said rotation prevention means in inoperative position following said manual operation to said position, said latching means being operated on separation of the rollers and released when the rollers are brought together.

28. In a fabric measuring machine, a pair of rollers normally held against each other, one of the rollers being a driving roller, means for holding said driving roller against operative rotation, means for spacing the rollers and holding them spaced to permit free entrance of the material to be measured between the rollers, and means operated by the entrance of material between the spaced rollers to render the holding means inoperative thereby freeing the driving roller for operative rotation.

29. In a machine of the class described, a pair of rollers normally held against each other between which fabric is adapted to be drawn, indicating means driven by one of said rollers, means for abruptly stopping the driving roller and acting to do so when the end of a length of material measured passes a point closely adjacent the rollers, and means for preventing rebound of the roller in the opposite direction.

30. In a machine of the class described, a driving roller and a presser roller, means for holding the presser roller spaced from the driving roller, whereby fabric to be measured may be placed between the rollers, means normally holding the driving roller against operative rotation, means projecting at an angle across the space between the rollers when the same are separated and operated by the entrance of fabric between the rollers to displace said last named means, there being operative association between said last named means and the roller rotation prevention means such that said roller rotation prevention means is rendered inoperative by said placing of the fabric between said rollers.

31. In a cloth measuring machine, the combination of a measuring roller, a presser roller associated therewith and adapted to be spaced from the measuring roller, means for normally holding the measuring roller against operative rotation, a casing over the rollers having a slot adjacent and paralleling the rollers for the entrance of fabric between the rollers, said casing having a table at the lower side of the said slot provided with a second slot also paralleling the rollers and located near the same, a bar adapted to enter the second slot and formed to be moved out of its slot on the placing of fabric between the spaced rollers, said bar on displacement by the fabric engaging the roller rotation prevention means and moving it to inoperative position.

32. In a machine of the class described, a pair of rollers associated to grip and be rotated by fabric placed between them, means to prevent operative rotation of the rollers in a forward direction, additional means to prevent rotation of the rollers in the opposite direction, and means operated by the fabric placed between the rollers for measurement to render both of said rotation prevention means inoperative during the measurement of said fabric.

33. In a cloth measuring machine, the combination of a pair of rollers associated to be pressed against each other or against fabric placed between them, means to prevent rotation of the rollers in one direction, additional means for preventing rotation of the rollers in the opposite direction, and means for holding said rotation prevention means inoperative during the measurement of fabric by drawing the same between the rollers, but freeing said rotation prevention means to act when the said fabric has passed out of contact with said last mentioned means.

34. In a machine of the class described, a pair of rollers between which fabric is adapted to be drawn, a housing for one of the rollers over which the fabric passes, said housing having a slot in its upper side parallel and adjacent to the rollers, means for holding the rollers from operative rotation, restraining means mounted so as to normally enter the said slot but held from doing so by fabric thereunder, said restraining means engaging with the rotation prevention means to render the same inoperative when fabric is located under said restraining means and covers said slot but allowing free action of the rotation prevention means when the fabric has passed by the slot to uncover it to permit said restraining means to enter said slot.

35. A construction containing the elements in combination defined in claim 34, said slot and restraining means being closely fitted so that fabric will not enter the slot from pressure of the said restraining means during a measuring operation.

In testimony whereof I affix my signature.

ANTHONY VANDERVELD.